(No Model.)
F. NEWHOUSE.
VELOCIPEDE.
No. 456,590. Patented July 28, 1891.
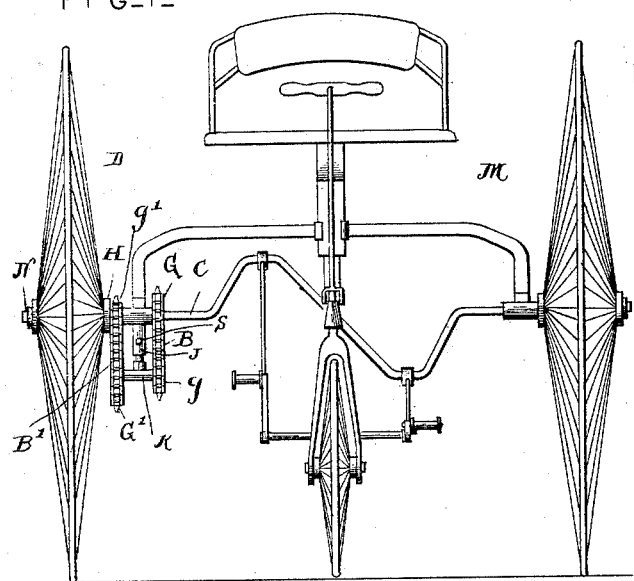
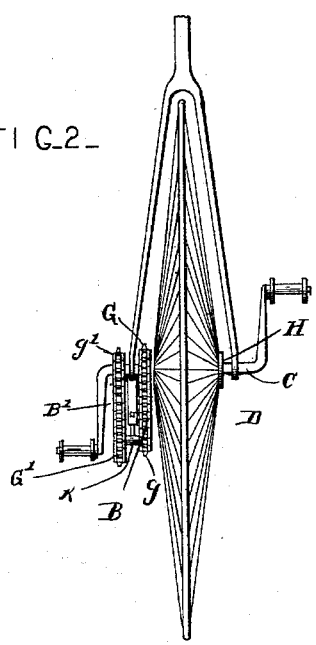
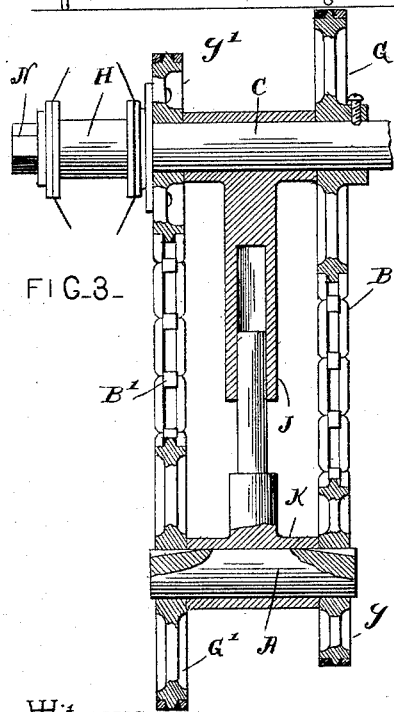
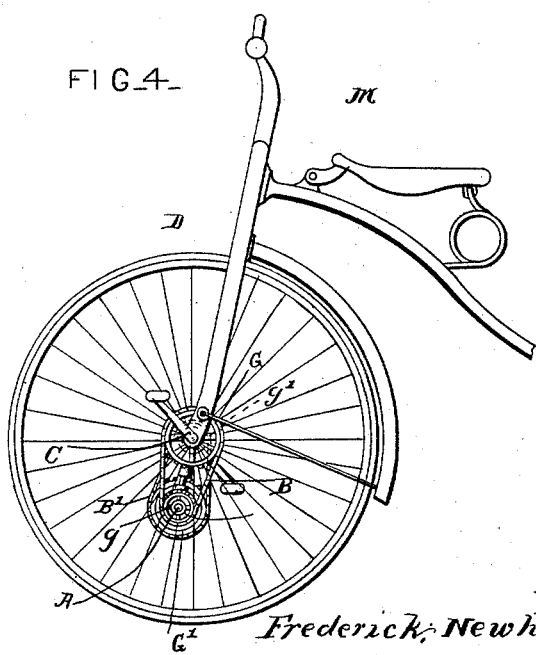
Witnesses
Geo. E. Frech.
N. T. Collamer.
Inventor
Frederick Newhouse
By his Attorneys,
C. A. Snow & Co.

UNITED STATES PATENT OFFICE.

FREDERICK NEWHOUSE, OF TOLEDO, OHIO.

VELOCIPEDE.

SPECIFICATION forming part of Letters Patent No. 456,590, dated July 28, 1891.

Application filed February 3, 1891. Serial No. 380,073. (No model.)

*To all whom it may concern:*

Be it known that I, FREDERICK NEWHOUSE, a citizen of the United States, residing at Toledo, in the county of Lucas and State of Ohio, have invented a new and useful Velocipede, of which the following is a specification.

This invention relates to velocipedes, and more especially to the motive power thereof; and the object of the same is to provide improved means for increasing the speed of revolution which is imparted to the crank-axle by the driver.

To this end the invention consists of the general and specific details of construction hereinafter more fully described and claimed, and as illustrated on the sheet of drawings, wherein—

Figure 1 is a front elevation of one form of tricycle embodying my invention. Fig. 2 is a front elevation of the driver-wheel of a bicycle embodying my invention. Fig. 3 is an enlarged central section of the speed-increasing devices and the hub of the driving-wheel. Fig. 4 is a side elevation of a so-called "Safety" machine with my invention applied.

Referring to the said drawings, the letter M designates a machine, which may be any of the ordinary types of velocipedes now in use or in the course of manufacture.

D is the driving-wheel, and C the crank-axle, to which power is applied by the driver. I have illustrated in the various views different types of machines; but all of them necessarily embody the crank-axle and the driving-wheel, and with the exception of these elements further reference to or description of these machines will not be herein made, as their construction is well known, or at least a matter of taste. The end of the crank-axle extends completely through the hub H of the driver, although said hub is loosely mounted thereon. Keyed to the crank-axle is a large sprocket-wheel G, connected by a chain belt B with a small sprocket $g$, which is mounted on a supplemental axle A. The latter is journaled in a bracket K, whose upper end preferably telescopes into a pendent bracket J, mounted upon the crank-axle C, and a bolt or set-screw S holds the two brackets in adjusted position. On the other end of the supplemental axle A is a large sprocket G', connected by an endless belt B' with a small sprocket $g'$, which turns loosely upon the crank-axle C, adjacent the end of the bracket J, and which is keyed to the inner end of the hub H.

With the construction above described, when the crank-axle C is rotated by the driver the sprocket G is turned, and its speed of revolution is multiplied as it is communicated to the sprocket $g$ by the belt B. Hence the supplemental axle A revolves faster than the crank-axle C. In the same manner the large sprocket G' drives the small sprocket $g'$ at a greater speed, and hence the hub H turns faster than the supplemental axle A. In this manner the power imparted to the crank-axle is twice increased in speed, though correspondingly decreased in force. The hub H turns upon the outer end of the crank-axle, where it finds a firm bearing, and a ball or roller bearing may be located between these parts without in the least departing from the spirit of my invention. A nut N and dust-guard of some approved pattern are preferably located on the outer end E of the crank-axle C, as indicated. When the chain belts B and B' become loose, the brackets J and K are adjusted by the set-screw S to take up such looseness in a manner well understood.

In Fig. 1 I have shown my invention applied to one form of tricycle, in Fig. 2 to one form of ordinary, and in Fig. 4 to one form of Safety, although it will be understood that the same is applicable to velocipedes of various constructions, or of use wherever it is desired to multiply speed at the sacrifice of a little power.

The great advantage resulting from the use of this invention is the economy of space and the simplification of the necessary mechanism.

Although I have not illustrated it, a dust or dress guard may surround the chain and the wheels, and other minor changes in construction may be made without departing from the spirit of my invention. Among such changes I desire to mention here that instead of endless chains and sprocket-wheels I might obviously use intermeshing gear-wheels, the only difference in that case being that the supplemental axle would revolve in a direction opposite to that of the main axle.

What is claimed as new is—

The combination, with a crank-axle journaled in a bracket, a large sprocket-wheel keyed thereon adjacent the inner end of said bracket, a small sprocket-wheel loose thereon adjacent the outer end of the bracket, and a driving-wheel journaled on the end of said crank-axle and connected with said small sprocket-wheel, of a movable bracket telescoping into said other bracket, a set-screw for holding the brackets in adjusted position, a supplemental axle journaled in said movable bracket and having sprocket-wheels at its ends in alignment with those on the crank-axle, and endless chains connecting said sprocket-wheels in pairs, as and for the purpose set forth.

In testimony that I claim the foregoing as my own I have hereto affixed my signature in presence of two witnesses.

FREDERICK NEWHOUSE.

Witnesses:
  L. L. CRAWFORD,
  JAMES STRATTON.